March 22, 1960   B. BARÉNYI ET AL   2,929,639
WHEEL SUSPENSION FOR VEHICLES INCLUDING AN AUXILIARY FRAME
Filed April 11, 1955   2 Sheets-Sheet 1
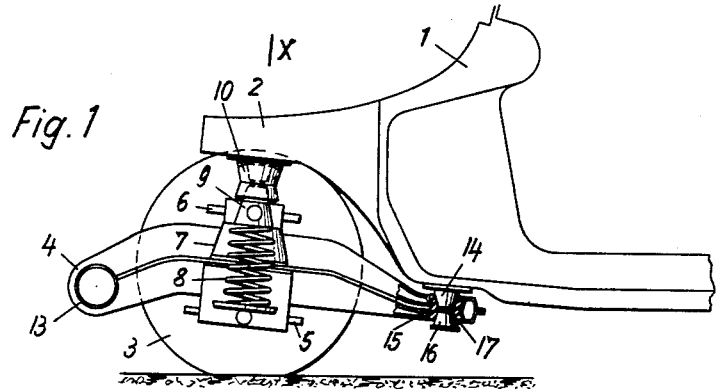
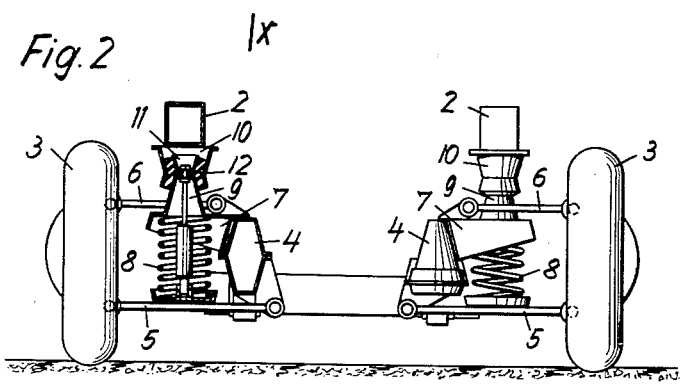
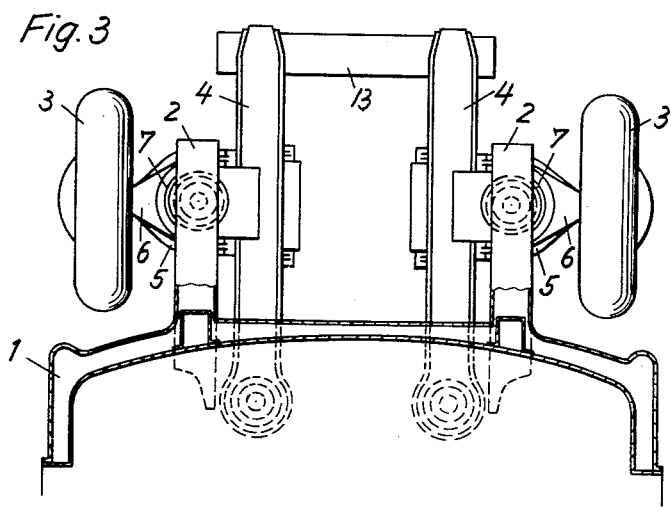
INVENTOR
BÉLA BARÉNYI
KARL WILFERT
BY
ATTORNEYS.

March 22, 1960  B. BARÉNYI ET AL  2,929,639
WHEEL SUSPENSION FOR VEHICLES INCLUDING AN AUXILIARY FRAME
Filed April 11, 1955  2 Sheets-Sheet 2
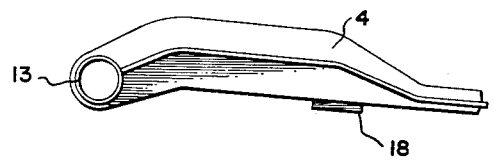
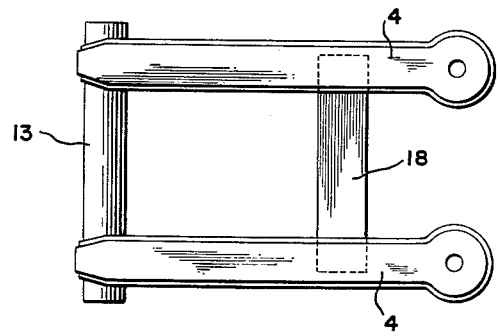
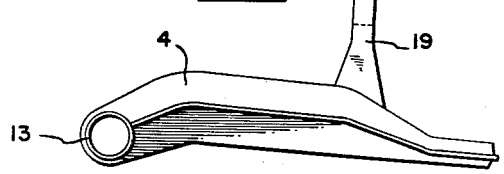
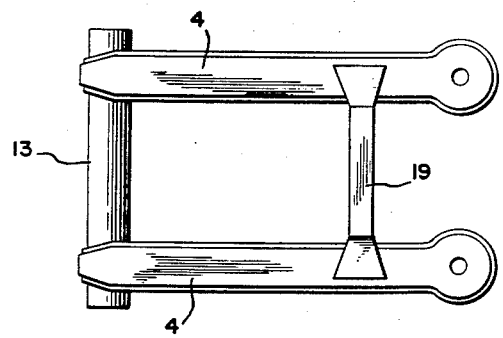
INVENTORS
BÉLA BARÉNYI
BY KARL WILFERT
ATTORNEYS

United States Patent Office 2,929,639
Patented Mar. 22, 1960

2,929,639
WHEEL SUSPENSION FOR VEHICLES INCLUDING AN AUXILIARY FRAME

Béla Barényi, Stuttgart-Hohenheim, and Karl Wilfert, Stuttgart-Degerloch, Germany, assignors to Daimler-Benz Aktiengesellschaft, Stuttgart-Unterturkheim, Germany Application April 11, 1955, Serial No. 500,556

Claims priority, application Germany April 13, 1954

15 Claims. (Cl. 280—106.5)

The present invention relates to an axle suspension for automobiles which includes an auxiliary frame which is resiliently mounted on the main framework of the car or the car body itself and, in turn, resiliently supports the wheels thereof.

It is an object of the present invention to provide a resilient axle suspension for absorbing the shocks and vibrations which would otherwise be transmitted to the car body.

It is another object of the present invention to provide an auxiliary frame of an automobile with two main supporting points which are arranged within the transverse plane of the vehicle, including the direction of the up and down movement of the centers of the car wheels and at least one other supporting point within the wheel base of the car.

Another object of the present invention is to provide an axle suspension which requires very little space and transmits the main forces directly to the supporting structure of the car so that the auxiliary frame will not be subjected to any dangerous bending or torsional forces.

According to the present invention, the framework of a car, the wheels of which are individually and resiliently suspended, may be supported by two main supporting points arranged above the main springs, and preferably in such a manner that these supporting points are coaxial with the springs.

A very simple construction of such a suspension or support may be obtained according to the invention by providing the spring supports on the auxiliary car frame with a suitable extension on which the respective supporting points are then arranged. These main supporting points may, in turn, be provided on a longitudinal support or a crossarm of the auxiliary frame or on jiblike projecting arms thereof.

The auxiliary frame according to the invention may also be supported intermediate the wheel base by having its inner end extend underneath the bottom of the car body and by being supported thereon. Such support may include two additional supporting elements, which means that altogether four supporting points are provided which are positioned in such a way that lines connecting the four points preferably form the shape of a trapezoid when viewed in a plan view.

For the purposes of the invention it is preferable to make the auxiliary frame, as seen in a plan view, of either U-shaped or H-shaped design, and when made of U-shaped design, to direct the open ends of the frame either outwardly or inwardly. The auxiliary frame suspension according to the invention may also be applied either to the front or rear wheels of a car or to both sets of wheels.

Further objects, features, and advantages of the present invention will appear from the following detailed description thereof and the accompanying drawings, in which Fig. 1 shows a longitudinal section through an axle suspension designed and constructed according to the present invention;

Fig. 2 shows at the left side a cross section and at the right side a front view of the same suspension;

Fig. 3 is a plan view thereof.

Figure 4 is a side view of the auxiliary frame assembly showing one mode of construction thereof.

Figure 5 is a plan view thereof.

Figure 6 is a side view of the auxiliary frame assembly showing a second mode of construction thereof, and Figure 7 is a plan view thereof.

Referring to the drawings, the car body 1 may be of any suitable design or shape and preferably consists of a hollow, self-supporting sheet metal body, the front wall of which has mounted thereon a pair of jiblike projecting arms 2. The supporting structure of the car includes the front and rear wheels 3 which are mounted individually and pivotally on the longitudinal supports 4 of an auxiliary frame, for example, by means of a pair of guide arms 5 and 6. A cylindrical spring 8 is mounted under initial tension between the lower arms 5 and a bracketlike extension 7 on the longitudinal supports 4. The extensions 7 have a projecting end 9 in the shape of a truncated cone, by means of which they are resiliently mounted on the jiblike projecting arms 2, preferably in a manner so as to be easily disconnected therefrom thereby forming the main supporting points of the car body. These main supporting points lie in a transverse plane $x-x$, Figure 1, that is inclined toward the center of the vehicle and includes the direction of the up and down movement of the centers of the wheels 3 as well as the center lines of the springs 8. For this purpose, each of the jiblike projecting arms 2 has mounted thereon a bushing 10 in the shape of a double cone. The pointed end 9 of the extensions 7 projects into this bushing 10 and its outer end is connected to an opposite conical member 11, preferably so as to be easily disconnected therefrom, for example, by being bolted thereto. Also, annular resilient cushions 12, preferably of rubber are interposed between the sleeve 10 and the truncated conical members 9 and 11.

The outer ends of the two longitudinal supports 4 of the auxiliary frame are rigidly secured to each other by a crossarm 13 so as to form a U-shaped structure and their inner ends project below the bottom of the car body 1 and are resiliently mounted thereon. For this purpose, the car body 1 has secured thereto a lug 14 of truncated cone-shape which extends into a double cone-shaped bore or bushing 15 in the longitudinal support 4. An opposite conical member 16 is secured to the conical lug 14 so as to be easily disconnected therefrom, for example, by being bolted thereto. Again, an annular resilient cushion 17, preferably of rubber, is interposed between the bushing 15 and the two conical members 14 and 16. These supporting points 14 at the inner ends of the auxiliary frame and the main supporting points of the car body at 10 are positioned such that lines connecting the four points form the shape of a trapezoid when viewed in a plan view.

Adjacent their inner ends, the two longitudinal supports 4 may also be rigidly connected to each other by means of a substantially straight crossarm 18 (Figures 4 and 5) or a yoke-shaped crossarm 19 (Figures 6 and 7) which is preferably placed in front of the front wall of the car body 1 and extends to the level of the jiblike arms 2. The crossarm 18 or 19, together with the longitudinal supports 4, form an auxiliary frame of substantially H shape when seen in a plan view. In the latter case, the space between the inner ends of the longitudinal supports 4 remains clear so as to mount the gear transmission therein. However, the auxiliary frame may also be of U-shaped design so that the two longitudinal supports 4 are rigidly secured to each other by a crossarm at their inner ends.

Although our invention has been illustrated and described with reference to the preferred embodiments thereof we wish to have it understood that it is in no way limited to the details of such embodiments or to the specific examples described, but is capable of numerous modifications within the scope of the appended claims.

Having thus fully disclosed our invention, what we claim is:

1. In combination with an automobile having a body, and wheels for supporting said body thereon, suspension means for said wheels including an auxiliary frame, means for resiliently mounting said auxiliary frame on said body, means for resiliently suspending said wheels on said auxiliary frame, said mounting means including two main supporting points on said auxiliary frame located within a transverse plane inclined toward the center of the vehicle and including the direction of the up and down movement of the centers of said wheels, and at least one additional supporting point on said auxiliary frame located within the wheel base of the car and between the planes of said wheels.

2. In an automobile as defined in claim 1, wherein said auxiliary frame as seen in a plan view is substantially U-shaped with the open end thereof directed toward the center of the car.

3. In an automobile as defined in claim 1, wherein said auxiliary frame as seen in a plan view is of substantially H-shape.

4. In combination with an automobile having a body, and wheels for supporting thereon said body, suspension means for said wheels including auxiliary frame, means for resiliently mounting said auxiliary frame on said body, means for resiliently suspending said wheels on said auxiliary frame, said mounting means including two main supporting points on said auxiliary frame located within a transverse plane inclined toward the center of the vehicle and including the direction of the up and down movement of the centers of said wheels, at least one additional supporting point on said auxiliary frame located within the wheel base of the car and between the planes of said wheels, said resilient means including individual substantially cylindrical springs the center line of which being disposed within said plane for supporting each of said wheels, said two main supporting points being located above said springs.

5. In an automobile as defined in claim 4, wherein said auxiliary frame is provided with a bearing element for supporting each of said springs, each of said bearing elements having an upper extension which, in turn, carries the element forming one of said main supporting points.

6. In combination with an automobile having a body, and wheels for supporting thereon said body, suspension means for said wheels including an auxiliary frame, means for resiliently mounting said auxiliary frame on said body, means for resiliently suspending said wheels on said auxiliary frame, said mounting means including two main supporting points on said auxiliary frame located within a transverse plane inclined toward the center of the vehicle and including the direction of the up and down movement of the centers of said wheels, and at least one additional supporting point on said auxiliary frame located within the wheel base of the car and between the planes of said wheels, said resilient means including individual substantially cylindrical springs, the center line of which being disposed within said plane for supporting each of said wheels, said two main supporting points being located above said springs and being coaxial therewith.

7. In combination with an automobile having a body, and wheels for supporting thereon said body, suspension means for said wheels including an auxiliary frame, means for resiliently mounting said auxiliary frame on said body, means for resiliently suspending said wheels on said auxiliary frame, said mounting means including two main supporting points on said auxiliary frame located within a transverse plane inclined toward the center of the vehicle and including the direction of the up and down movement of the centers of said wheels, and at least one additional supporting point on said auxiliary frame located within the wheel base of the car and between the planes of said wheels, said auxiliary frame comprising longitudinal and transverse arms, said main supporting points being mounted on at least one of said arms.

8. In combination with an automobile having a body, and wheels for supporting thereon said body, suspension means for said wheels including an auxiliary frame, means for resiliently mounting said auxiliary frame on said body, means for resiliently suspending said wheels on said auxiliary frame, said mounting means including two main supporting points on said auxiliary frame located within a transverse plane inclined toward the center of the vehicle and including the direction of the up and down movement of the centers of said wheels, and at least one additional supporting point on said auxiliary frame located within the wheel base of the car and between the planes of said wheels, the inner end of said auxiliary frame extending underneath the bottom of said car body, and including means for supporting said inner end on said body.

9. In combination with an automobile having a body, and wheels for supporting thereon said body, suspension means for said wheels including an auxiliary frame, means for resiliently mounting said auxiliary frame on said body, means for resiliently suspending said wheels on said auxiliary frame, said mounting means including two main supporting points on said auxiliary frame located within a transverse plane inclined toward the center of the vehicle and including the direction of the up and down movement of the centers of said wheels, and two additional supporting points on said auxiliary frame located within the wheel base of the car and between the planes of said wheels at such points that the main and additional supporting points when connected by lines form the corners of a trapezoid.

10. A wheel suspension for an automobile having a body and wheels for supporting thereon said body, comprising an auxiliary frame, means for resiliently mounting said auxiliary frame on said body, spring means for resiliently suspending said wheels on said auxiliary frame, means for individually and pivotally supporting each of said wheels on said auxiliary frame to enable swinging movements thereof in a plane disposed transversely to the longitudinal direction of said vehicle and inclined toward the center of said vehicle, said mounting means comprising two main supporting points on said auxiliary frame and including resilient bearing means arranged coaxially with said spring means, said spring means and said bearing means being disposed within said plane.

11. In an automobile as defined in claim 10, wherein at least one additional supporting point is being provided for resiliently supporting said auxiliary frame to said body, said additional supporting point being limited between said wheel base of said automobile and between the planes of said wheels.

12. In an automobile according to claim 10 wherein said spring means comprise individual substantially cylindrical springs supporting each of said wheels, said two main supporting points being located coaxially above said spring means.

13. In an automobile according to claim 10 wherein said auxiliary frame as seen in a plan view is substantially U-shaped with the open end thereof directed toward the center of the automobile.

14. In an automobile as defined in claim 10, wherein said auxiliary frame as seen in a plan view is of substantially H shape.

15. In an automobile as defined in claim 10 wherein said auxiliary frame comprises longitudinal and transverse arms, said main supporting points being mounted on at least one of said arms.

References Cited in the file of this patent

UNITED STATES PATENTS

| | | |
|---|---|---|
| 2,117,588 | Armstrong | May 17, 1938 |
| 2,633,203 | Paton | Mar. 31, 1953 |
| 2,746,556 | Nallinger | May 22, 1956 |

FOREIGN PATENTS

| | | |
|---|---|---|
| 81,505 | Austria | Oct. 11, 1920 |